United States Patent
Luo et al.

(10) Patent No.: US 10,421,673 B2
(45) Date of Patent: Sep. 24, 2019

(54) SIMPLE AND EFFICIENT ELECTROLYSIS METHOD AND DEVICE FOR MAKING ELECTROLYZED WATER FROM PURE WATER

(71) Applicants: Minxiong Luo, Shenzhen (CN); Ming Li, Shenzhen (CN)

(72) Inventors: Minxiong Luo, Shenzhen (CN); Ming Li, Shenzhen (CN)

(*) Notice: Subject to any disclaimer, the term of this patent is extended or adjusted under 35 U.S.C. 154(b) by 739 days.

(21) Appl. No.: 14/900,165

(22) PCT Filed: Jun. 16, 2014

(86) PCT No.: PCT/CN2014/000585
§ 371 (c)(1),
(2) Date: Apr. 19, 2016

(87) PCT Pub. No.: WO2014/201852
PCT Pub. Date: Dec. 24, 2014

(65) Prior Publication Data
US 2016/0236955 A1    Aug. 18, 2016

(30) Foreign Application Priority Data

Jun. 20, 2013 (CN) .......................... 2013 1 0256411

(51) Int. Cl.
*C25B 1/02* (2006.01)
*C25B 9/00* (2006.01)
(Continued)

(52) U.S. Cl.
CPC .......... *C02F 1/46109* (2013.01); *C25B 11/03* (2013.01); *C25B 15/02* (2013.01);
(Continued)

(58) Field of Classification Search
CPC .... C25B 1/02; C25B 1/00; C25B 1/04; C25B 9/00; C25B 9/18; C25B 11/00
(Continued)

(56) References Cited

U.S. PATENT DOCUMENTS

| 6,428,689 B1 | 8/2002 | Kameyama et al. |
| 2008/0116080 A1* | 5/2008 | Lal .......................... C25B 1/003 205/334 |
| 2016/0083856 A1* | 3/2016 | Iwatsu ................... C25D 17/10 205/477 |

FOREIGN PATENT DOCUMENTS

| CN | 201923864 U | 8/2011 |
| CN | 102603036 A | 7/2012 |

(Continued)

*Primary Examiner* — Zulmariam Mendez
(74) *Attorney, Agent, or Firm* — Cheng-Ju Chiang

(57) ABSTRACT

A simple and efficient electrolysis device for making electrolyzed water from pure water, comprising a controllable electrolysis power supply, an electrolytic electrode plate assembly connected to said power supply, said component being immersed within the to-be-electrolyzed water when in operation. A gap is provided between an anode and a cathode of the electrolytic electrode plate assembly, the gap distance being greater than 0 mm and less than 10 mm, said gap being designed according to the principle of optimal minimization, being less than 0.1 mm when necessary. The area of the surfaces, on either side of the gap, of the anode and the cathode of the electrolytic electrode plate assembly are designed according to the principle of optimal maximization, within the occupied set space. Also disclosed is a simple electrolysis method for making electrolyzed water from pure water.

5 Claims, 4 Drawing Sheets

(51) Int. Cl.
  *C25B 1/04* (2006.01)
  *C25B 11/00* (2006.01)
  *C02F 1/461* (2006.01)
  *C25B 11/03* (2006.01)
  *C25B 15/04* (2006.01)
  *C25B 15/02* (2006.01)

(52) U.S. Cl.
  CPC .... *C25B 15/04* (2013.01); *C02F 2001/46123* (2013.01); *C02F 2001/46152* (2013.01); *C02F 2001/46171* (2013.01); *C02F 2201/4612* (2013.01); *C02F 2201/4614* (2013.01); *Y02E 60/366* (2013.01)

(58) Field of Classification Search
  USPC ............................................. 204/230.2, 280
  See application file for complete search history.

(56) References Cited

FOREIGN PATENT DOCUMENTS

| | | |
|---|---|---|
| CN | 203668073 U | 6/2014 |
| JP | H6-246272 A | 9/1994 |

* cited by examiner

SIMPLE AND EFFICIENT ELECTROLYSIS METHOD AND DEVICE FOR MAKING ELECTROLYZED WATER FROM PURE WATER

CROSS REFERENCE TO RELATED APPLICATIONS

The present application is a 35 U.S.C. § 371 National Phase conversion of International (PCT) Patent Application No. PCT/CN2014/000585, filed on Jun. 16, 2014, which claims benefit of Chinese Patent Application No. 201310256411.2, filed on Jun. 20, 2013, the disclosure of which is incorporated by reference herein. The PCT International Patent Application was filed and published in Chinese.

FIELD OF THE INVENTION

The present invention relates to a simple and efficient electrolysis method and device for making electrolyzed water from pure water, and belongs to a field of making functional water by electrolysis without any isolation membrane.

BACKGROUND OF THE INVENTION

Functional Water is defined by the functional water association of Japan as "a water solution with reproducible and useful functions via artificial methods". As for various functional water, electrolyzed water is the best known by people at the scientific view, and is deemed by Ministry of Health, Labour and Welfare of Japan (National Ministry of Health of Japan) as the only water with real functions to health. The Ministry of Health of China has authorized to manufacture and sell the electrolyzed water devices. The present invention relates to a field of manufacturing electrolyzed water using the electrolysis method. Negative-potential reduced water and hydrogen-rich water using the electrolysis method are the main types of the electrolyzed water, and also are the main objects of the present invention. The scientists found: the water source from the long-life Villages in the world has the common characters of containing hydrogen and an Oxidation—Reduction Potential ORP thereof being negative, which is called negative-potential reduced water, and generally called reduced water, and afterwards be short for functional water. Such common characters cannot be found in the water source in other areas. Usual river-water, lake-water, tap-water, and drinking water such as purified water in market, distilled water and mineral water, doesn't contain hydrogen, has ORP about +150 mv-500 mv, and has no reducibility. In recent years, based on a lot of scientific reach results and clinical verifications, "medical treatment and nourishing of life using reduced water" based on a principle of effectively removing oxygen free radicals by hydrogen-contained water becomes popular.

Currently, the devices in the market for manufacturing functional water or reduced water by an electrolysis method, mainly are divided into such two types: with membrane or without membrane, herein, the electrolysis device without membrane is the direction to be developed. However, purified water including distilled water has low conductivity and thus was considered that it was incapable of producing electrolysis current and can not be electrolyzed into functional water or reduced water with negative potential by electrolysis method. After Searching prior patents or devices about electrolyzing water with or without membranes, no actual solutions were found to solve the technical problems of effectively producing functional water or reduced water with negative potential from purified water by electrolysis method. In consideration that purified water is widely drank, and water source with a low-conductivity close to purified water widely exists, it is very urgent for human being to solve the electrolyzing technical problems of producing reduced water adapted for purified water. To resolve the problem, a long-time researches are conducted by the applicant, and finally produces a key breakthrough at both theory and practice.

SUMMARY OF THE INVENTION

The present invention provides a simple electrolysis method and a device thereof for effectively making electrolyzed water adapted to purified water including distilled water, and relates to a field of electrolyzing water without a membrane.

Why was it always believed that pure water including distilled water cannot produce electrolyzed functional water by the electrolysis method? The main reason is that the pure water's conductivity is considered near zero, using the existing electrolysis method and the device thereof, electrolysis of pure water including distilled water has a current about zero, thus cannot be performed. A new and simple electrolysis method and a device thereof provided by the applicant, can increase the conductivity of pure water in the market including distilled water without any artificially-added additives, thus can form a circularly-increasing current of electrolysis, in such way to realize electrolysis of pure water including distilled water, and effectively making electrolyzed water which is pure reduced water with a relatively-high negative potential, and can be used for people to drink, cure and nourish his life. Weak acidic reduced water with a negative potential can also be manufactured in the present invention, which can be used for anti oxidation beauty and skin care; the present invention can be used to produce electrolyzed water such as hydrogen-rich water etc., or can be used in water treatment or the like; which is advantageous for human's health, and has outstanding advantages of energy conservation and environment protection.

The present invention is based on three new discoveries of the applicant:

As the first new discovery, manufacturing electrolyzed water or reduced water via the electrolyzing water method substantially is to transfer a power energy from a power supply to a functional activation energy or a reduction-activation energy of water, the reduction-activation energy and making a reduced water in a negative potential as embodiments for key illustration in the present invention. Main indicators for evaluating reduction-activation energy include: active hydrogen content, with a measuring unit of ppb/L or ppm/L; an Oxidation-Reduction Potential of water, namely ORP, with a measuring unit mV of voltage; and an ORP negative potential also called a negative potential. Generally, if water has a relatively high active hydrogen content and negative potential, then the reduction-activation energy of water namely an anti Oxidation-Reduction of water is relatively strong. The hydrogen content and the ORP negative value are called by the applicant as indictors of reduced water or negative-hydrogen reduced water. The intensity and time of electrolysis current applied are necessary for the power energy to be transferred into activation energy so as to obtain a relatively-high indicator of reduced water. In an electrolyzed water production device, a distance between an electrolytic cathode and an anode thereof is closer, and areas of both the cathode and the anode are lager, then an impedance of water is lower thus the electrolysis current will be higher at the same electrolyzing voltage; in other words, the electrolysis current is inversely proportional to the distance between the cathode and the anode, and is proportional to effective areas of the cathode and the anode; this discovery is vitally important to electrolyze pure water and distilled water with a very-low conductivity.

As the second discovery, a conductivity of pure water including distilled water in the market is not absolutely zero, namely there are always traces of impurities besides water molecules, some electrolyzed impurities will release electrons, which can increase conductivity, and more electrons can be released as electrolysis repeated, which will increase the electrolysis current. The practical test shows: if a distance between the cathode and the anode is lower, impurities can be better electrolyzed, and then the electrolysis current will increase higher. The traces of impurities are shorted as impurities by the Applicant.

As the third discovery, impurities in pure water including distilled water, can be electrolyzed to produce free electrons and ion particles, which is not only useful to produce and increase the electrolysis current, but also is very important to produce the indicator of reduced water namely to produce more hydrogen H, hydrogen gas $H_2$, and specially to produce negative hydrogen ion $H^-$. Such Principle is described as follows: in the electrolyzed water production device, water molecules are electrolyzed to $H^+$ and $OH^-$, $OH^-$ can be further electrolyzed into O, H, electron $e^-$ etc., while the impurities are electrolyzed to release lots of free electrons $e^-$, which can increase chances that $H^+ + e^- \rightarrow H$ and $H + e^- \rightarrow H^-$, thus hydrogen content in water is increased; increased $H^-$ content can strengthen an ability of water of releasing electrons or anti-oxidation and reduction, and then the ORP value becomes negative from positive. Which cannot be ignored that: some ion particles electrolyzed from impurities are very import for stable existence of negative hydrogen ions $H^-$; H or $H^-$ electrolyzed from $OH^-$ within a carrier of ion particles of impurities can exist for a relatively long time, H using ion particles of impurities as carriers thus has more chances to combine free electrons to become $H^-$; professionals of Japan Sanetaka Shirahata and Shigeo Ohta had some ideas about such phenomenon, which is a main reason for the electrolyzed water whit a relative-high indicator of reduced water. Those three discoveries above are generally called as "a principle of making reduced water via water impurities", and shortly as an electrolysis principle of water impurities, which discloses a nature and key of making reduced water using water-electrolysis method. In fact, when reduced water is electrolyzed from non-pure water, impurities in water are electrolyzed and also produce electrolysis current and specially form the indicator of the reduced water; however, there are so many impurities in non-pure water as nameless hero and that cannot be focused and deeply known.

As the above three discoveries namely electrolysis principle of water impurities, a method to electrolyze pure water in the present invention has such characters of: first, a reasonably closest distance possible between the cathode plate and the anode plate, second, largest equivalent areas possible of both the cathode plate and the anode plate, a greater electrolysis current possible at a certain electrolysis voltage such as a safety voltage and other corresponding conditions. On the other hand, the closest distance between both plates shall be limited to a necessary water flowability during electrolysis, because a reasonable water flowability is advantageous for repeated electrolysis of trace impurities in water, which can increase more free electrons and the electrolysis current. Certainly, higher electrolysis voltages can also increase the electrolysis current, but it has some limitations in practical application. Experiments show that: in a water container with a practical area and a reasonable structure of both the cathode plate and anode plate, the distance between both plates become narrow to a range of 0.5-0.1 mm, the electrolysis current of pure water including distilled water may be about 60-200 mA or even higher, and pure reduced water with a relatively-high indicators is able to be produced within several minutes. While in the existing electrolyzed water production device, the distance between both plates or an equivalent distance thereof usually is above 10 mm, even greater, a relatively-high impedance will be formed between both plates during the electrolysis of pure water including distilled water, the electrolysis current is about zero or just several mA; even electrifying for a long time, a result of electrolysis cannot be better. Some literature disclosed that: there was activated carbons in water able to release electrons during electrolysis in the existing electrolysis device, which could increase current and the indicator of reduced water; however experiments have discovered that: the literature is a misunderstanding to a temporary effect of the activated-carbon pollution or residual impurities, when pure water was purified several times, or activated carbons were completely cleaned therefrom, the impurity pollution or residual impurities were greatly reduced, the electrolysis current would be reduced to several mA, the indicator of reduced water became worse; for which the reason is that the distance between both the cathode plate and the anode plate is relatively far such as above 2 mm, or even more, activated carbon itself capable of releasing trace impurities are hardly ionized to produce free electrons under a safety voltage, it is more difficult to obtain a relatively-high indicator of reduced water. However, activated carbon itself capable of releasing trace impurities can be ionized to produce free electrons under a safe voltage in the electrolysis device of the present invention. Actual measured indicator of reduced water by electrolyzing pure water at two different distances between both plates and with/without activated carbon are listed in the following Table 1:

TABLE 1

Actual measured indicator of the indicators of reduced water at different distances between both plates and with/without activated carbon

| structural characters testing items | | distance between both cathode plate and anode plate = 0.3 mm | | distance between both cathode plate and anode plate = 0.2 mm | |
|---|---|---|---|---|---|
| | | without activated carbon | with activated carbon | without activated carbon | with activated carbon |
| indicators of reduced water | ORP (mv) | −231 | −425 | 159 | 148 |
| | H content (ppb) | 262 | 457 | 0 | 0 |
| | electrolysis current (mA) | 80 | 250 | 3 | 8 |

Remark: electrolysis is operated for 3 minutes, at a normal temperature, with raw water: ORP = +237 mV, a content of H = 0, pH = 5.5

Thus, the technical problems of producing reduced water with negative potential from pure water including distilled water are well resolved according to the principle of electrolyzing impurities which is discovered by the applicant of the present invention.

As for an electrolysis method of pure water including distilled water provided in the present invention, why the electrolysis current is circularly increased and an better electrolysis effect is obtained? The most important reason is that: the shorter distance possible between both electrode plates reduces the impedance between both plates, trace impurities in pure water are easily electrolyzed by a local strong current at a narrow gap between both plates, thus lots of electrons are released, and then a relatively-high initial electrolysis current is obtained, therefore, more water molecules $H_2O$ are electrolyzed into $OH^-$ and $H^+$, $OH^-$ is further electrolyzed to O, $H^+$ and $e^-$ at the anode plate, and the electrolysis current is further increased; the greater electrolysis current is able to prompt more impurities and water molecules to be electrolyzed, then the electrolysis current is further increased again, in such a repeating manner, then the electrolysis current is increased to a maximum. The maximum of the current is up to a composite factor of a structure of the electrolysis device and water quality in the present invention; a good water flowability inside and outside of the gap between the cathode plate and the anode plate greatly influences the indicator level of reduced water, as for this, the applicant will give a detail description in following to the fourth discovery.

The present invention focuses on electrolyzing impurities in pure water to release electrons and particle carriers so as to produce reduced water, and discloses technical solutions to produce electrolyzed water from raw water with a low conductivity: via reducing the gap distance between both plates and increasing effective areas thereof as possible, without any additives, pure water including distilled water can be efficiently electrolyzed to reduced water with a high activated energy and a negative potential; the gap distance between the different plates is reasonably reduced as possible, it is able to be narrow to 0.1 mm or least if necessary, which is outstandingly advantageous for increasing activated energy of electrolyzed water so as to realized energy conservation and environment protection. Via comparison practical experiments and scientific analysis to the electrolysis device of the present invention with the existing technique of electrolyzing water, the great advantages of the present invention at least relates: firstly, at a comparable quality and value of both device, the device of the present invention has energy conservation of 70%-90%, 60%-90% volume reduction, and 20%-30% water conservation. Secondly, pure reduced water at a negative potential is able to be produced at a low cost in the present invention, such technological achievement is never available before; it is necessary to add some additives such as electrolysis promoting agent to the existing electrolysis device so as to electrolyze and produce pure water though filtration, thus the prior device couldn't be produced pure reduced water at negative potential, but had a risk of the additive safety. Thirdly, the method and device of the present invention are able to produce alkaline or acidic electrolyzed water, also able to produce such reduced water with alkalinity near raw water while the indicator of reduced water is independent of the alkalinity, which are adapted for most people to drink. However, the prior electrolyzed water production device was only able to produce alkaline reduced water, and the relation between the indicator of reduced water and alkalinity are tight; if a relatively-high indicator of reduced water was selected, water would have a PH value exceeding 9 and be strongly alkaline, which was not adapted for people to drink. A fourth advantage, the electrolysis device of the present invention is able to greatly increase the electrolysis efficiency of non pure water, can be applied to produce functional water such as hydrogen-rich water for environmental protection and cleaning, which are advantageous to health and environment of human being.

There are another two discoveries based on the electrolysis principle of trace impurities in water, which are very import to direct the techniques of the present invention:
the fourth discovery, a structural configuration of both the cathode plate and the anode plate shall be most beneficial for a reasonable water flowability between plates during electrolysis, so that more impurities can enter the gap between plates and be electrolyzed, the indicator of reduced water can accordingly be produced and increased, which is very important for the present invention to provide a practicable electrolyzed water production device with a high efficiency and a high quality and value. "Areas of both plates are configured to be properly asymmetric and unequal", such structure of the electrolyzed water production device can obtain reduced water with a high indication thereof, and can also reduce the device cost. The configuration of asymmetric area of both plates shall be most beneficial for the ion cluster and gas bubbles generated from water molecules being electrolyzed between both plates to quickly spread from edges of both plates upwards. Therefore, if the both plates are configured as an upper plate and a lower plate, an area of the upper plate shall be appropriately smaller than that of the lower plate, but not much smaller, since the effective electrolysis areas of the both plates are limited by the area of the smaller plate, if much smaller, the electrolysis current will be much smaller and then influence the improvement of the ORP negative value, lose more than gain finally. Experiments verify that: if a structural configuration of the both plates with a smaller upper plate and a larger lower plate, or with a plurality of upper plates of small areas, water molecules between both plates are electrolyzed to ion group, hydrogen and oxygen will diffuse upwards or sideward from the edge of the plate of the smaller area under an electric field of the lower plate, in such way that water molecules and ion cluster flow in the gap between both plates, which is beneficial for more water molecules and impurities to be electrolyzed, so that electrolysis efficiency can be improved. The edge of the upper plate is configured as a curve for increasing a length thereof, which are more beneficial for ion group and gas bubbles to flow outwards so as to improve electrolysis efficiency. Otherwise, if the upper plate has a larger area while the lower plate has a smaller area, hydrogen and oxygen flow to the edge of the plate with small area, will be stopped by the broader area of the upper plate, and then cannot flow upwards smoothly, bubbles will remain round the edge of the plate of smaller area, which is not beneficial for ion clusters and gas to flow in the gap between both plates; ion groups has poor flowability, are remained in the gap between plates and generated by water molecules electrolyzed, will be recombined into water molecules most likely, while reduction of ions will substantially decrease the chance of forming oxygen and hydrogen and particularly decrease the chance of forming negative hydrogen, which substantially decreases the electrolysis efficiency. The indicator of reduced water is substantially worse than that of the upper plate with larger area while the lower plate with smaller area. If the efficient electrolysis areas of both plates are symmetrical and both plates have overlapped edges thereof, it will also not very beneficial for ion group and gas bubbles to spread between the plates, and the indicator of reduced water is inferior to that of the upper plate with larger area while the lower plate with smaller area. The applicant discovers that: the upper plate is configured with a smaller area while the lower plate is configured with a larger area, the upper plate is configured as a cathode plate while the lower plate is configured as an anode plate, such device can obtain a relative-high indicator of reduced water. The reason is that: the larger lower plate as the anode plate can attract more electrons $e^-$, $H^-$, $OH^-$, thus more $OH^-$ can be electrolyzed to O, $H^-$, H, $e^-$ at a joining place of the anode plate and a lower edge of the upper plate, and all of which can increase the chance of forming $H^-$, and furthermore can help H, $e^-$ to spread transversely and positive ions to spread upwards, the flowability of ions are improved, therefore, the indicator of reduced water can be effectively increased. Otherwise, if the cathode is configured as a lower plate with a larger area, there is no advantage described above, thus the indicator of reduced water become worse. Comparing to both plates being horizontally or vertically disposed, the vertical plates are more beneficial for electrolyzed water to flow, since vertical plates, or slightly-inclined gaps between the smaller upper plate and the larger lower plate, are more beneficial for gas bubbles generated from ionization of water molecules to flow upwards so as to increase flowability of water, therefore, a relatively-high indicator can be obtained. Larger or smaller areas of the cathode plate or the anode plate are dependent on a shape, a substantial area and a structure of the plate. When the area of the anode plate is larger than the area of the cathode plate, the efficiency of producing electrolyzed water may be high, or may be just converse. The principle depends that: areas of both plates are unsymmetrical and then water electrolysis at the cathode and anode plates are unsymmetrical, in comparison to symmetrical electrolysis, $H^-$ or H ions have less chance to be recombined into $H_2O$ or $H_2$, while H has more chance to combine electrons released from impurities into $H^-$, and the indicator of reduced water is able to be greatly improved. Indicators of reduced water for three electrolysis advices with different plate areas and structures are listed in table 2, in the first structure, the anode plate has an area greatly larger than that of the cathode plate and the cathode plate is disposed above the anode plate; in the second structure, the anode plate with a larger area is disposed above the cathode plate with a smaller plate; in the third structure, both the cathode and anode plates have the same area.

TABLE 2

Comparison of indicators of reduced water for three electrolysis devices with different plate areas and structures

| The Electrolysis Devices | | $1^{st}$ structure | $2^{nd}$ structure | $3^{rd}$ structure |
|---|---|---|---|---|
| Indicators of Reduced Water | ORP (mV) | −201 | +52 | −129 |
| | H content (ppb) | 310 | 0 | 138 |

Remark: except for area difference for the small plate, the above three electrolysis devices are the same for other conditions; electrolysis is operated for 3 minutes, at a normal temperature, with raw water: ORP = +176 mv, a content of H = 0, pH = 5.5

Therefore, testing result is consistent with the above analysis.

The fifth discovery, an ORP negative value of electrolyzed reduced water is mainly dependent on a content of negative hydrogen. Therefore, one of the important differences of the present invention from the prior art, as a main object of the present invention to resolve such pending problems of water electrolysis, reduced water with rich negative hydrogen and in a high ORP negative value is electrolyzed from pure water even distilled water. $H_2$ or H or $H^-$ were believed by some experts as activated hydrogen to help body for antioxidation, but they argued whether $H_2$ or H or $H^-$ was the activated hydrogen, therefore, it is unknown where the important ORP negative value from. A book titled "Hydrogen Revolution—Miracle Cure and Clinic Research about Negative Hydrogen Ion" by Japan experts Taneaki Oikawa and Naitou Mareo issued in 2008, disclosed that the negative hydrogen ions has such double functions of both clearing oxygen free radicals and promoting metabolism; a relation between negative hydrogen and the value of ORP was indirectly mentioned in this book. A presentation titled "Activated Hydrogen" by Japanese professor Sanetaka Shirahata described that H and electrons can be combined due to coexisting in a carrier of metal particles, which has a function of clearing oxygen free radicals. Electrons carried in negative hydrogen ions $H^-$ are more easily attracted by an external electric field to be released than electrons contained in $H_2$ or H; therefore, in comparison to $H_2$ or H, negative hydrogen ions $H^-$ are crucial for the ORP negative value. It is particularly easily for $H^-$ to releases electrons or to be combined with oxygen free radicals $O^+$ into $H_2O$ after being taken in human cells, which turns harm into good, and thus $H^-$ is a better antioxidant than either $H_2$ or H. The present invention focus on manufacturing reduced water with a high content of negative hydrogen ions and a high ORP negative value. Table 3 shows the indicator data of the reduced water manufactured by one of devices of the present invention.

TABLE 3

A: Indicator dada of Reduced water Manufactured by One of Devices of the Present Invention

| | | Time for electrolysis | | |
|---|---|---|---|---|
| | | 3 min | 5 min | 8 min |
| indicator of Reduced water | ORP (mV) | −235 | −369 | −458 |
| | Content of H (ppb) | 286 | 397 | 493 |

B: Indicator data of Reduced Water Changed With Time after Electrolysis Finished in Table 3A

| | | Time after electrolysis | | |
|---|---|---|---|---|
| | | 10 min | 120 min | 240 min |
| Indicator of Reduced water | ORP (mv) | −442 | −397 | −176 |
| | Content of H (ppb) | 468 | 433 | 266 |

Remark:
electrolysis works for 3 minutes, at usual temperature, with raw water: ORP = +176 mv, a content of H = 0

Accordingly, during a process of either electrolytic activation or activation energy reduction after electrolysis, the ORP negative value and the content of H change synchronously, increase or decrease synchronously. The ORP negative value in proportion to the content of H verifies that an ORP negative value is mainly dependent on a content of H, while the content of H may be a sum of the three or two from of $H_2$, H or $H^-$, but what's the relation between each of them and the ORP negative value? The present invention based on experiments and research of the applicant, and discloses that an ORP negative value mainly depends on the negative hydrogen, not $H_2$ or H. Though an instrumentation for content detection of the negative hydrogen in water is not available now, the content of H of the indicator data in the above Tables are obtained from the existing hydrogen dissolution tables, which may contain $H_2$, H or $H^-$.

A relation between the content of negative hydrogen and ORP is confirmed via an exclusion analysis method in the present invention: first, the content of $H_2$ cannot affect the value of ORP, and has no relation to the ORP negative value, and accordingly can be excluded; second, H easily reacts that: $H+H=H_2$, and can be kept in water for a relatively short time, it must be temporary even if H can affect the value of ORP, and accordingly H can be excluded too; experiments in the present invention disclose that the phenomena of generating $H_2$ bubbles via $H+H=H_2$ has been finished in several seconds after electrolysis is finished, which verifies that the content of H in water is rapidly reduced so that on $H_2$ bubbles can be continually generated yet. In fact, the ORP negative value can be kept for a long time while on the contrary, but H cannot keep long time in water after electrolysis. The ORP negative value of the reduced water in the present invention can be kept the same or even higher level even after the reduced water has been deposited for 15 days, which depends the electrolysis method of the present invention to improve the activity of reduced water and to obtain an ORP negative value with a high activation energy. The ORP negative value in the reduced water can be kept long for several hours even the reduced water is exposed to air, which is contrary to the rapid reduction of H in water. Evidently, during manufacturing the reduced water via electrolysis method, the content of H has no close relation to the ORP negative value. Experiments in the present invention disclose that: the ORP negative value of the reduced water manufactured in the device of the present invention mainly depends on the content of negative H, namely Therefore, the variation of the content of H in above Tables 3 can be approximately regarded as a variation of the content of negative H. A main object of the present invention is to improve both the content of H in the reduced water and the ORP negative value. Off was regarded as a factor to affect the ORP negative value, which is not the fact, since a decrease of the ORP negative value has no relation to the change of pH, and both alkaline water and acidic water can be obtain the same ORP negative value using the electrolysis method of the present invention, which verifies that the ORP negative value has no relation with the pH value or the content of $OH^-$.

Restricted substances such as residual chlorine in reduced water is necessary to be considered in this present invention, particularly, the electrolysis device of the present invention is also adapted for raw water including impure drinking water such as boiled tap water, cool boiled water, direct-drink water, or mineral water, and the indicator of the reduced water will be higher, which accords with the above electrolysis principle of impurities; while due to the varied quality of raw water, residual chlorine in reduced water may be increased, thus an adapted electrode plate configuration is desired to remove residual chlorine. It is a good method to remove residual chlorine or the like that materials with high adsorptivity such as activated carbon are used to absorb residual chlorine and some heavy metal ions in water during electrolyzing water.

As a basic technical solution, a simple and high effective method and device suitable for pure water including distilled water for producing reduced water with a negative potential are provided, wherein, the device comprises an electrolysis power supply, and an electrolysis electrode-plate assembly connected with the power supply and immersed in water to be electrolyzed during work, a gap is provided between a cathode and an anode of the electrode-plate assembly; a gap distance thereof is at a range of greater than 0 mm and less than 10 mm, and the gap is designed according to a principle of optimal minimization, the gap distance can be less than 0.1 mm if necessary; an area of the gap between the cathode and the anode are designed according to a principle of optimal maximization within the electrodes assembly; the gap distance in accord with optimal minimization and the gap area in accord with optimal maximization are aimed at that: the electrolysis device at a certain electrolysis voltage, water quality and environment, can strongly electrolyze impurities in water and water molecules, and thus produce lots of free electrons; a relatively high electrolysis current is accordingly obtained. As one of preferable embodiments, the anode and the cathode are respectively configured as a cellular electrode and a comblike electrode capable of being inserted into the cellular electrode. Comb teeth of the comblike electrode substantially correspond to cellular holes of the cellular electrode and can be fitted in the according holes, gaps are defined between surfaces of the comb teeth and surfaces of the cellular holes; the effective gap area between the cathode and the anode approximates to an equivalent gap area between interfaces of the cellular electrode and the comblike electrode plus equivalent gap areas between all of the comb teeth and the cellular holes.

As one technical solution, the electrolysis device configured as a water container in accordance with an embodiment of the present invention, comprises a container with water therein, a cover, a controllable electrolysis power supply mounted in the cover, and the electrolysis electrode-plate assembly mounted in the cover and extending downwards into the container. The electrode-plate assembly comprises three electrodes immersed in water in the container during electrolysis. The electrolysis electrode-plate assembly is wrapped by the cathode as a first electrode shaped as a cylinder and produced from stainless steel. The stainless-steel cylinder is open at the top, has a plat bottom with a mesh structure, and thus facilities water to flow inside and outside of the cylinder; the cylinder electrode is connected with a negative electrode as a first output of the controllable power supply via a conductor. The cellular electrode as a second electrode thereof produced from activated carbon or other applicable materials and in a cake-like shape has a diameter adapted to the cylinder cathode, and is horizontally mounted in the middle or upper part of the cylinder cathode; and there is a first gap set between a circumference of the cake-like electrode of activated carbon and an inner circumference of the cylinder cathode. The activated-carbon electrode is connected with a second output of the controllable power supply via a conductor. The electrode plate with comb teeth as a third electrode thereof is mounted below the activated-carbon electrode. The comb teeth have an amount, shapes and distribution corresponding to the cellular holes of the cellular electrode, and are able to be fitted in the corresponding cellular holes. A fourth gap is set between the surfaces of the comb teeth and the surfaces of the cellular holes. A fifth gap is set between a lower surface of the activate-carbon electrode with a cake-like shape and an upper surface of the comblike electrode plate (namely the electrode plate with comb teeth or the third electrode), and the comblike electrode plate has mesh holes, which is beneficial to improve a flowability of water and ions. The effective area of a second gap between the cellular electrode and the comblike electrode approximates to the equivalent area of the fourth gap between all the comb teeth and the cellular holes plus the effective area of the fifth gap. The comblike electrode is connected with a third output of the controllable power supply via a conductor, and a third gap is set between a bottom surface of the comblike electrode and a bottom surface of the cylinder cathode. Gap distance of the first, second or third gaps among the three electrodes are at a range of greater than 0 mm and less than 10 mm, and can be less than 0.1 mm if necessary. Pure water, distilled water or usual drinking water can be electrolyzed into weakly alkaline or acidic electrolyzed water with negative potential via the electrode-plate assembly under a control of the first, second outputs and the negative electrode of the controllable power supply, and the weakly alkaline electrolyzed water has slightly higher or lower alkaline.

As a second technical solution, water is electrolyzed to reduced water with negative potential using the above basic technical solution in accordance with the present invention. The electrolysis device comprises a section of tubular channel, the controllable electrolysis power supply, and the electrolysis electrode-plate assembly. The electrolysis electrode-plate assembly is the same as the first technical solution above. Water is fed to one end of the tubular channel, through the electrolysis electrode-plate assembly, and is taken out from the other end of the tubular channel. Pure water, distilled water or usual drinking water can be electrolyzed to weakly alkaline electrolyzed water with negative potential and slightly higher or lower alkaline, or can be electrolyzed to acidic electrolyzed water with negative potential, or can be electrolyzed to such reduced water with a pH approximating to the raw water via the electrode-plate assembly under a control of the first, second outputs and the negative electrode of the controllable power supply.

A third technical solution of the present invention is similar to the first technical solution, just except a difference structure of the electrolysis electrode-plate assembly. In the electrolysis electrode-plate assembly of this technical solution, the first electrode is configured as a number N of letter Es vertically aligned and tightly fitted together, and the second electrode of the electrolysis electrode-plate assembly comprises a number N of horizontally-opposed letter Es vertically aligned and tightly fitted together; accordingly letter Es-shaped electrode and opposed letter Es-shaped electrode are inserted each other via concave-convex means and form plurality of letter Z-shaped gaps communicated each other. The letter Z-shaped gap distance is at a range of greater than 0 mm and less than 10 mm in accordance with a minimization principle, and may be less than 0.1 mm if necessary.

The structure of the electrolysis electrode-plate assembly is not limited to the above first, second and third technical solutions, other structures of the electrolysis electrode-plate assembly based on a minimization of gap distance and a maximization of the gap area of the gap between electrodes to effectively increase the electrolysis current of water and impurities so as to manufacture the reduced water of electrolyzed water desired can still be covered by the claimed scope of the present invention.

BRIEF DESCRIPTION OF THE DRAWINGS

The physical embodiments adopted in the present invention will be presented by the following depicted embodiments and accompanying drawings for further explanations.

DETAILED DESCRIPTION OF THE INVENTION

The First Embodiment

Figure 1:
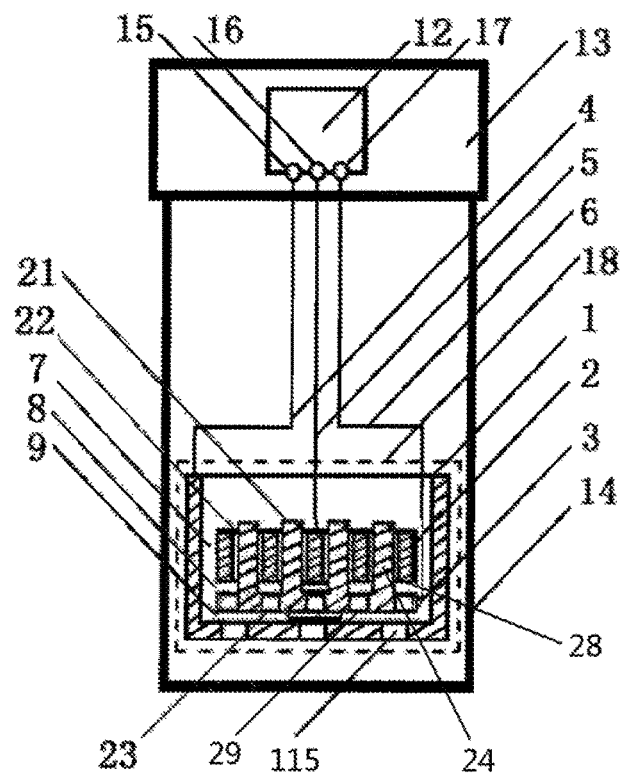
FIG. 1 is a schematic view of a simple but effective electrolysis device capable of manufacturing electrolyzed water from pure water in accordance with a first embodiment of the present invention.

Referring to FIGS. 1-7, an electrolyzed water production device provided in accordance with embodiments of the present invention, comprising an electrolysis power supply 12 and an electrolysis electrode assembly 18 connected with the electrolysis power supply; wherein the electrolysis electrode assembly is immersed in water to be electrolyzed during work; there are neighboring electrodes 1, 2, 3 at different voltages in the electrolysis electrode assembly, and the neighboring electrodes 1, 2, 3 at different voltages forms gaps 7, 8, 9, 22 therebetween; a gap distance of each gap 7, 8, 9, 22 is set at a range of greater than 0 mm and less than 10 mm, and configured according to a minimization principle; within a dimension of the electrode assembly 18, the gaps between the neighboring electrodes 1, 2, 3 at different voltages has a gap area configured according to a principle of optimal maximization; the neighboring electrodes 1, 2, 3 at different voltages with the gap distance configured according to a minimization principle while the gap area configured according to a principle of optimal maximization whereby the electrolysis device is capable of strongly electrolyzing impurities and water molecules so as to generate more free electrons and obtain a high electrolysis current. The method and device is capable of well electrolyzing pure waster with trace impurities or distilled water, and also is applicable to electrolyze water with a relative higher conductivity than pure water such as non-purified water or drinking water.

Accordance with one embodiment, the neighboring electrodes 2, 3 at different voltages of the electrolysis electrode assembly 18 are respectively configured as a cellular and cake-like electrode 2 and a comblike electrode 3 correspondingly insertable to each other; the cellular and cake-like electrode 2 can be configured as a number N of cellular tubes 24 electrically connected with each other, and the comblike electrode 3 can be configured with a number N of comb teeth 23 electrically connected with each other, N is from 1 to any value; the comb teeth 23 of the comblike electrode are fixed to a plate 29; the comb teeth 23 of the comblike electrode 3 are capable of correspondingly inserting in cellular holes 28 in the cellular and cake-like electrode 2; a gap 8 is set between opposite surfaces of the cellular and cake-like electrode 2 and the comblike electrode 3; a gap distance between the cellular and cake-like electrode 2 and the comblike electrode 3 is at a range of greater than 0 mm and less than 10 mm, and can be at a range of greater than 0 mm and less than 0.1 mm if necessary.

A water container of the above basic technical solution is used in this embodiment. Referring to FIG. 1, an electrolysis device comprises a water container 14, a cover 13 of the water container 14, a controllable electrolysis power supply 12 mounted in the cover 13, and an electrolysis electrode-plate assembly 18 mounted in the cover 13 and extending downwards into the container 14. The assembly 18 comprises three electrodes, and is immersed in water during electrolysis. The electrolysis electrode-plate assembly is wrapped by a cylinder cathode 1 of stainless steel as one electrode of the three, the cylinder cathode 1 has a opened top and a bottom with mesh holes 115 so as to facilitate water inside and outside of the cylinder cathode 1 to flow. The cylinder cathode 1 is connected with a negative electrode 15 as a first output of the electrolysis power supply 12 by a conductor 4. A cellular and cake-like electrode 2 in a diameter adapted to the cylinder cathode 1 is horizontally fitted in a middle or upper part of the cylinder cathode 1. There is a first gap 7 set between a circumference of the cellular and cake-like electrode 2 and an inner circumference of the cylinder cathode 1. The cellular and cake-like electrode 2 is connected with an output 16 of the controllable power supply 12 by a conductor 5. A comblike electrode plate is mounted under the cellular and cake-like electrode 2, and the comblike electrode plate 3 has comb teeth 21 in an amount, shapes and distribution corresponding to cellular holes 28 of the cellular and cake-like electrode 2, and the teeth 21 are able to be fitted in the corresponding cellular holes 28. A fourth gap 22 is set between the surface of each comb tooth and the inner wall of the corresponding cellular hole 28. A fifth gap 8 is set between a lower surface of the cellular and cake-like electrode 2 and an upper surface of the comblike electrode plate 3, and the comblike electrode plate 3 has mesh holes 23, which is beneficial to improve a flowability of water and ions. A total effective area of the gap between the cellular and cake-like electrode 2 and the comblike electrode plate 3 approximates to equivalent areas of a number N of gaps 22 plus the effective area of the gap 8. The comblike electrode plate 3 is connected with an output 17 of the controllable power supply 17 by a conductor 6. A third gap 9 is set between a bottom surface of the comblike electrode plate 3 and a bottom surface of the cylinder cathode 1. A gap distance of each gaps 7, 8, 9, and 22 between the electrodes is at a range of greater than 0 mm and less than 10 mm, is configured according to a minimization principle, and may be configured as less than 0.1 mm if necessary. The outputs 16, 17, 15 of the controllable power supply 12 forms control modes 1, 2, and 3 via different voltage combinations; and thus pure water, distilled water or usual drinking water can be electrolyzed to weakly alkaline electrolyzed water with negative potentials and slightly higher or lower alkaline or acidic electrolyzed water with negative potentials via the electrode-plate assembly under a control of the controllable power supply. The cylinder cathode 1 is fixedly connected with the negative output 15 of the controllable power supply 12, and a working process and principle of the electrolysis device will be described below.

The control mode 1 in accordance with the first embodiment is used to manufacture weakly alkaline reduced water with slightly higher alkaline. The control mode is characterized that: the output 17 of the controllable power supply 12 is connected with the output 15, the controllable power supply 12 provides a positive voltage to the cellular and cake-like electrode 2 via the output 16. Pure water including distilled water and trace amounts of impurities are electrolyzed mainly at the gaps 7, 8, and a number N of 22, and the cellular and cake-like electrode 2 as the anode with great equivalent specific surface area advantageously absorb negative chloride ions, and trace amount of impurities in water released from the cellular and cake-like electrode 2 are ionized to generate electrons, which is beneficial to increase electrolysis current and to advance the chance of $H+e^- \rightarrow H^-$, and a higher indicator of reduced water is accordingly obtained. During electrolysis, water molecules $H_2O$ are ionized or recombined to ions or materials such as $OH^-$, $H^+$, O, H, $H^-$, $O_2$, and $H_2$ etc. al. $O_2$ gas and $H_2$ gas can continuously rise upwards away from the opened top of the cylinder cathode 1, water and ions flowing in gaps in the cylinder cathode 1 can be accelerated, and water and impurities in the container 14 can repeatedly flow through the gaps 7, 8 and a number N of 22 and are electrolyzed, which is beneficial to increase the electrolysis efficiency. Moreover, the cellular and cake-like electrode 2 can strongly absorb negative ions such as $H^-$ and $OH^-$, the higher electrolytic strength are provided, the more negative ions such as $H^-$ and $OH^-$ are obtained, and the more negative ions such as $H^-$ and $OH^-$ are absorbed by the cellular and cake-like electrode 2; at the same time, more H+ and e− are combined to $H_2$ and $H_2$ rises out from water surface, the advantage of the equivalent area of the anode bigger than that of the cathode is apparent. Therefore, the content of $OH^-$ in water is higher than $H^+$ after electrolysis; the alkalinity of the reduced water is stronger, the pH value is higher. The content of $H^-$ is higher, then reduced water with higher indicator is produced, which is weakly alkaline reduced water with a relatively high alkalinity.

The control mode 2 in accordance with the first embodiment is used to manufacture weakly alkaline reduced water with slightly higher alkaline. The controllable power supply 12 provides a positive voltage to the cellular and cake-like electrode 2 via the output 16, the output positive voltage is lower than the control mode $1^{st}$; at the same time, the controllable power supply 12 provides a higher positive voltage to the comblike electrode plate 3 through the output 17. Water and impurities are electrolyzed mainly at the gaps 7 and 9, the positive voltage provide to the cellular and cake-like electrode 2 by the controllable power supply 12 is lower than the control mode 1, the absorbability of the cellular and cake-like electrode 2 to $OH^-$ and $H^-$ are accordingly weakened, thus the alkalinity of reduced water is lower than that via the control mode 1. The electrolysis at the gap 9 is capable of supplying $H^-$ to balance $H^-$ loss due to the weakened absorbability of the cellular and cake-like electrode 2, therefore, slightly-alkaline reduced water with higher indicator is according produced.

The control mode 3 in accordance with the first embodiment is used to manufacture acidic electrolyzed water. The cellular and cake-like electrode 2 is connected with the negative electrode 15 of the controllable power supply 12 via the output 16 and namely is connected with the cylinder cathode 1. The controllable power supply 12 provides a positive voltage to the comblike electrode plate 3 through the output 17. Water and impurities are electrolyzed at the gaps 9, a number N of 22, and 8. The cellular and cake-like electrode 2 is connected with the negative electrode 15 of the electrolysis power supply, has strong absorbability to positive ions such as $H^+$, and reduces the chance of $H^+ + e^- \rightarrow H_2$; at the same time, $OH^-$ in water is easily electrolyzed into $O_2$ and $H^-$. the gap 9 is relatively narrow, when the electrolysis uses the power supply 12 with a low and safety voltage to supply power source, the gap distance of the gap 9 usually is designed at a range of greater than 0 mm and less than 1 mm, more $O_2$ and less $H_2$ rise upwards from an inside edge of the cylinder cathode 1 through the gap 7, and then a fast flow of water, ion current and impurities are accordingly obtained, which is beneficial for $H^-$ generated at the gap 9 to spread outwards, such manner is repeated, and then the content of $H^+$ in water higher is than $OH^-$, and the pH value of reduced water is lower, therefore, acidic electrolyzed water with higher indicator is manufactured.

Table 4 shows the measured indicator data of alkaline or acidic electrolyzed water with a negative potential from pure water via the three control modes in accordance with this embodiment.

TABLE 4

Measured indicator Data of the Reduced water Manufactured from Pure Water via 3 Control Modes in accordance with the first embodiment

| Control Mode for electrolysis | | Control mode 1 | Control mode 2 | Control mode 3 |
|---|---|---|---|---|
| Indicator Reduced water | ORP (mv) | −657 | −523 | −210 |
| | Content of H (ppb) | 698 | 578 | 267 |
| | pH value | 9.8 | 8.5 | 6.1 |

Remark: electrolysis works for 3 minutes, at usual temperature, with raw water: ORP = +167 mv, content of H = 0, pH = 5.5.

The structure of the electrolysis device in accordance with the first embodiment is also applicable for unpurified water to manufacture reduced water in a negative potential, the principle and process is similar to the above. Table 5 below shows the indicator of reduced water produced from drinking water in accordance with this embodiment.

TABLE 5

Measured indicator of the Reduced water Manufactured from Drinking Water via 3 Control Modes in accordance with the first embodiment

| Control Mode for electrolysis | | Control mode 1 | Control mode 2 | Control mode 3 |
|---|---|---|---|---|
| Indicator of Reduced Water | ORP (mv) | −762 | −650 | −189 |
| | Content of H (ppb) | 798 | 687 | 238 |
| | pH value | 9.8 | 8.8 | 6.2 |

Remark: electrolysis works for 3 minutes, at usual temperature, with raw water: ORP = +286 mv, content of H = 0, pH = 7.5.

The Second Embodiment

Figure 2:
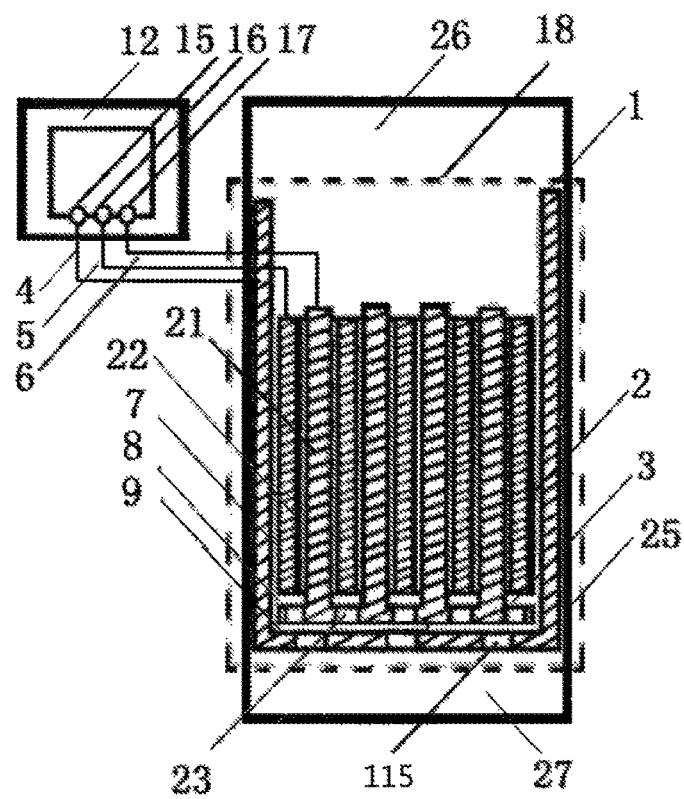
FIG. 2 is a schematic view of the simple but effective electrolysis device capable of manufacturing electrolyzed water from pure water in accordance with a second embodiment of the present invention.

The structure of the electrolysis device in accordance with this embodiment is shown in FIG. 2, and is another embodiment which manufactures reduced water with negative potential from water via the basic technical solution above. The electrolysis device comprises a section of tubular channel 25, the controllable electrolysis power supply 12, and the electrolysis electrode-plate assembly 18 mounted in the channel 25. The assembly 18 is the same as the first embodiment, the difference from the first embodiment is that: the gap distance of each gap 22 is M times longer than the first embodiment; water is fed to a water inlet 26 and through the electrode-plate assembly 18, and accordingly through the gaps 7, 8, and 9 between the electrodes, particularly through a number N of gaps 22 for being repeatedly electrolyzed, and then flows out from a water outlet 27. The outputs 16, 17, 15 of the controllable power supply 12 forms control modes 1, 2, and 3 via different voltage combinations; and thus pure water, distilled water or drinking water can be electrolyzed to negative-potential reduced water with different pH value under a control to the electrode-plate assembly 18. The measured indicator of reduced water in accordance with this embodiment are shown in Table 6 below.

TABLE 6

Measured Indicator of the Reduced water Manufactured from Pure Water via 3 Control Modes in accordance with the second embodiment

| Control mode for electrolysis | | Control mode 1 | Control mode 2 | Control mode 3 |
|---|---|---|---|---|
| Indicator of Reduced Water | ORP (mv) | −301 | −210 | −104 |
| | Content of H (ppb) | 332 | 231 | 118 |
| | pH value | 9.5 | 8.1 | 6.1 |

Remark: electrolysis works for 3 minutes, at usual temperature, with raw water: ORP = +242 mv, a content of H = 0, pH = 5.5.

The Third Embodiment

Figure 3:
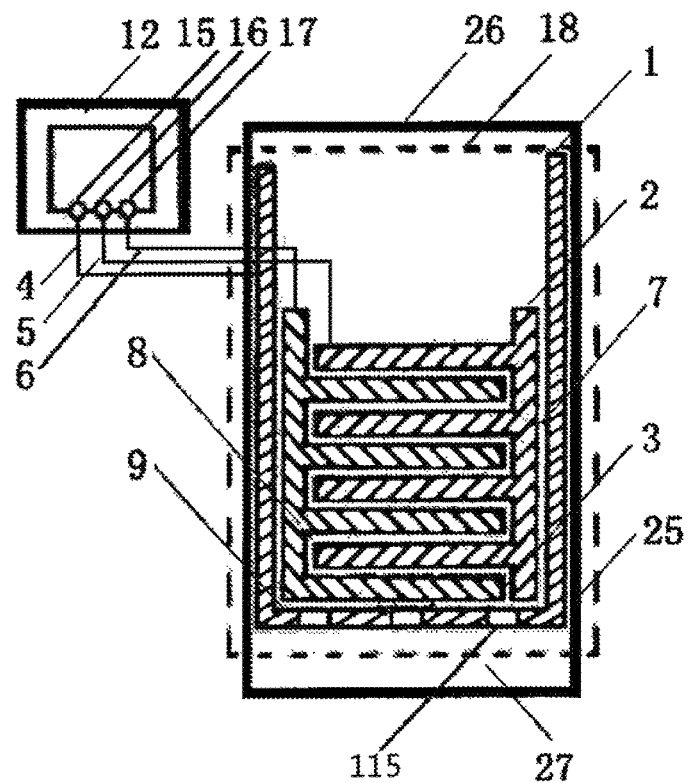
FIG. 3 is a schematic view of the simple but effective electrolysis device capable of manufacturing electrolyzed water from pure water in accordance with a third embodiment of the present invention.

The structure of the electrolysis device in accordance with this embodiment is shown in FIG. 3, performs similarly to the second embodiment, and is another embodiment which manufactures reduced water with negative potential from water via the basic technical solution. The electrolysis device comprises the section of tubular channel 25, the controllable electrolysis power supply 12, and the electrolysis electrode-plate assembly 18 mounted in the channel 25. The assembly 18 comprises three electrodes, and is immersed in water during work. The first electrode 1 of the electrolysis electrode-plate assembly 18 is a U-shaped cylinder; the first electrode 1 has an opened top and a plat bottom with mesh holes 115 so as to facilitate water flowing in the first electrode 1. The electrode 1 is connected with the output port 15 of the controllable power supply 12 via the conductor 4. The electrode 2 has a structure that a number N of horizontal opposite letter Es are aligned vertically and tightly fitted together. The electrode 3 has a structure that a number N of letter Es are aligned vertically and tightly fitted together. The opposed letter Es-shaped electrode 2 and the Letter Es-shaped electrode 3 are inserted each other via concave-convex means and form plurality of Z-shaped gaps 8 communicated each other. An outer peripheral surface of the electrode 2 and an inner peripheral surface of the electrode 1 form the gap 7 therebetween. The electrode 2 is connected with the output 16 of the electrolysis power supply 12 via the conductor 5. An outer peripheral surface of the electrode 3 and the inner peripheral surface of the electrode 1 form the gap 9 therebetween. The electrode 3 is connected with the output 17 of the electrolysis power supply 12 via the conductor 6. A gap distance of each of gaps 7, 8 and 9 is at a range of greater than 0 mm and less than 10 mm, and the gap distance is configured in accordance with a minimization principle, and may be less than 0.1 mm if necessary. During electrolysis, water flows from the water inlet 26 of the tubular channel 25 into and through the electrode-plate assembly 18, and through the gaps 7, 8, and 9 between the electrodes, particularly through a number N of gaps 22 for being repeatedly electrolyzed, and then flows out from a water outlet 27 of the tubular channel 25. The outputs 16, 17, 15 of the controllable power supply 12 forms control modes 1, 2, and 3 via different voltage combinations; and thus pure water, distilled water or drinking water can be electrolyzed to negative-potential reduced water with different pH value under a control to the electrode-plate assembly 18. The measured indicator of reduced water in accordance with this embodiment are shown in Table 7 below.

TABLE 7

Measured Indicator of the Reduced water Manufactured from Pure Water via 3 Control Modes in accordance with the third embodiment

| Control Mode for electrolysis | | Control mode 1 | Control mode 2 | Control mode 3 |
|---|---|---|---|---|
| Indicator of Reduced Water | ORP (mv) | −289 | −204 | −121 |
| | Content of H (ppb) | 309 | 230 | 143 |
| | pH value | 9.2 | 8.2 | 6.1 |

Remark: electrolysis works for 3 minutes, at usual temperature, with raw water: ORP = +263 mv, a content of H = 0, pH = 5.5.

The Fourth Embodiment

Figure 4:
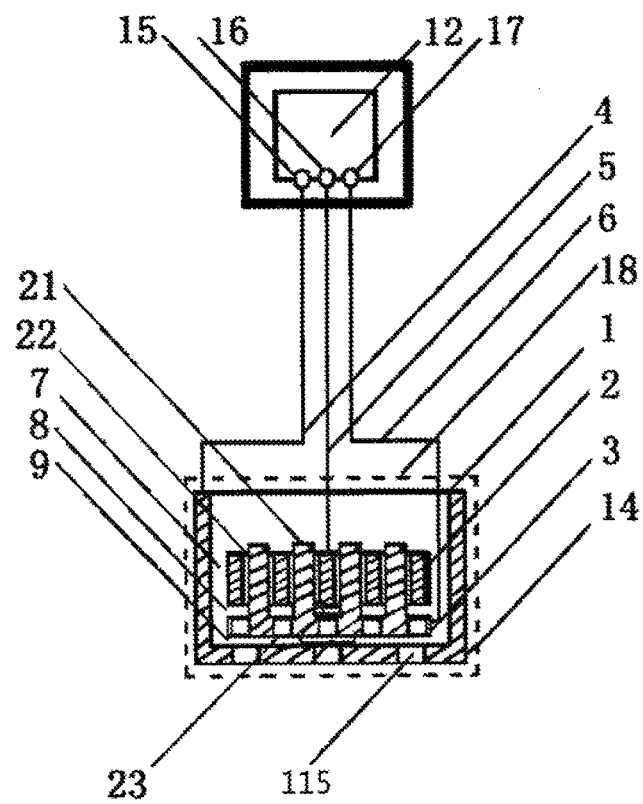
FIG. 4 is a sectional view the simple but effective electrolysis device capable of manufacturing electrolyzed water from pure water in accordance with a fourth embodiment of the present invention.

The structure of the electrolysis device in accordance with this embodiment is shown in FIG. 4, which is different from the first embodiment that the water electrolysis device or the electrolysis power supply 12 together with the electrode-plate assembly 18 can be configured as a portable electrolyzed water production device. The electrode-plate assembly 18 can be conveniently placed in water in any container and work under a control of the electrolysis power supply 12. The working principle and process of this embodiment are similar to the first embodiment, the electrode-plate assembly 18 can be placed in water in the container such as a cup or a bowl, and then can electrolyze water in the container to manufacture reduced water with different pH and high indicator. The measured indicator of reduced water in accordance with this embodiment are shown in Table 8 below.

TABLE 8

Measured Indicator of the Reduced water Manufactured from Pure Water via 3 Control Modes in accordance with the fourth embodiment

| Control Mode for electrolysis | | Control mode 1 | Control mode 2 | Control mode 3 |
|---|---|---|---|---|
| Indicator of Reduced water | ORP (mv) | −652 | −589 | −210 |
| | Content of H (ppb) | 687 | 613 | 267 |
| | pH value | 9.8 | 8.5 | 6.1 |

Remark: electrolysis works for 3 minutes, at usual temperature, with raw water: ORP = +251 mv, a content of H = 0, pH = 5.5.

The Fifth Embodiment

Figure 5:
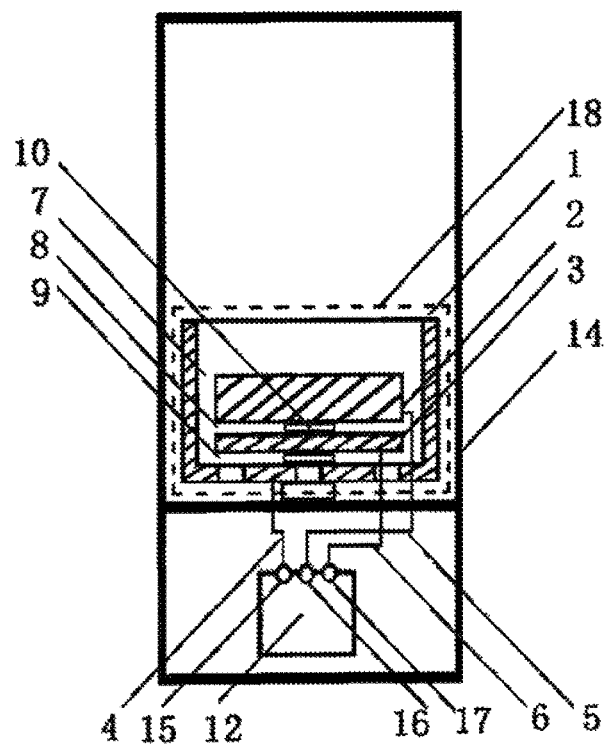
FIG. 5 is a sectional view the simple but effective electrolysis device capable of manufacturing electrolyzed water from pure water in accordance with a fifth embodiment of the present invention.

The structure of the electrolysis device in accordance with this embodiment is shown in FIG. 5, which is different from the first embodiment that: the electrolysis power supply 12 is mounted in a lower part of the container 14, the electrodes has simple structures, the electrode 2 is shaped as a cake, the electrode 3 is a conductive plate, the gap 8 is set between the electrode 2 and the electrode 3, and a number N of gaps 22 is lacked in comparison to the first embodiment. The electrolysis device in accordance with this embodiment is also applicable for the electrode 1 as a metal or nonmetal water container. The working principle and process of this embodiment are similar to the first embodiment, while the function of the gaps 22 in the numbers of N is lacked. The measured indicator of reduced water in accordance with this embodiment are shown in Table 9 below.

TABLE 9

Measured indicator of the Reduced water Manufactured from Pure Water via 3 Control Modes in accordance with the fifth embodiment

| Control Mode for electrolysis | | Control mode 1 | Control mode 2 | Control mode 3 |
|---|---|---|---|---|
| Indicator of Reduced water | ORP (mv) | −451 | −418 | −203 |
| | Content of H (ppb) | 474 | 463 | 247 |
| | pH value | 9.6 | 8.4 | 6.0 |

Remark: electrolysis works for 3 minutes, at usual temperature, with raw water: ORP = +242 mv, a content of H = 0, pH = 5.5.

The Sixth Embodiment

Figure 6:
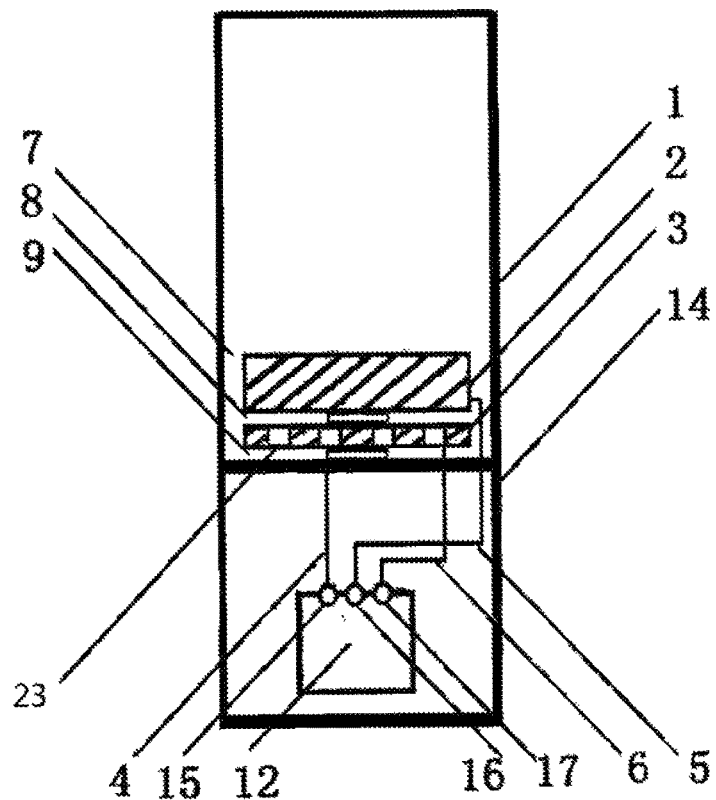
FIG. 6 is a sectional view the simple but effective electrolysis device capable of manufacturing electrolyzed water from pure water in accordance with a sixth embodiment of the present invention.

The structure of the electrolysis device in accordance with this embodiment is shown in FIG. 6, which is different from the fifth embodiment that: the cylindrical cathode 1 is replaced by the water container 14; the structure is simple, and is applicable for the water container 14 from conductive materials such as metal. The working principle and process of the electrolysis device in accordance with this embodiment is same as the first embodiment, besides lack of a number N of gaps 22. The measured indicator of reduced water in accordance with this embodiment are shown in Table 10 below.

TABLE 10

Measured Indicator of the Reduced water Manufactured from Pure Water via 3 Control Modes in accordance with the sixth embodiment

| Control Mode for electrolysis | | Control mode 1 | Control mode 2 | Control mode 3 |
|---|---|---|---|---|
| Indicator of Reduced Water | ORP (mv) | −448 | −406 | −198 |
| | Content of H (ppb) | 487 | 440 | 225 |
| | pH value | 9.6 | 8.4 | 6.0 |

Remark: electrolysis works for 3 minutes, at usual temperature, with raw water: ORP = +231 mv, a content of H = 0, pH = 5.5.

The Seventh Embodiment

Figure 7:
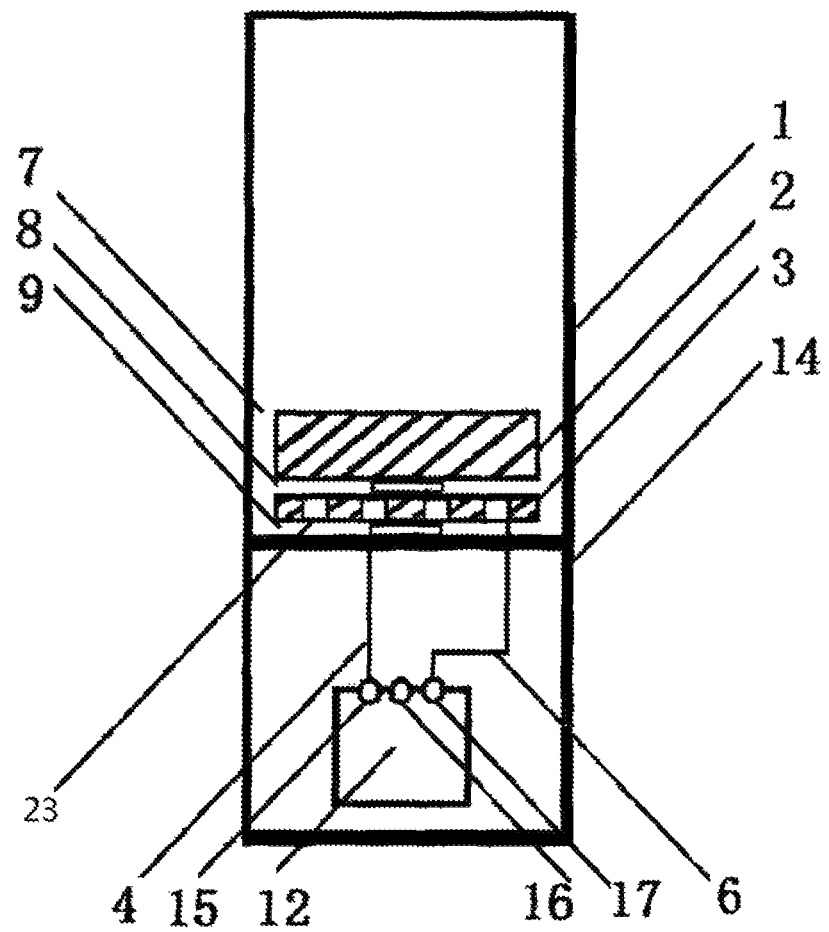
FIG. 7 is a sectional view the simple but effective electrolysis device capable of manufacturing electrolyzed water from pure water in accordance with a seventh embodiment of the present invention.

The structure of the electrolysis device in accordance with this embodiment is shown in FIG. 7, which is different from the sixth embodiment that: the control mode of the controllable electrolysis power supply and the electrolysis electrode-plate assembly are simplified, the electrode 2 is not connected with the electrolysis power supply 12, the electrolysis power supply 12 is connected with the electrode 1 via the output 15, the output 17 is connected with the electrode 3 and thus puts out the electrolysis voltage; and negative-potential reduced water with different pH values are manufactured meanwhile via a configuration of both the gap distances and the gap areas of the gaps 7, 8, and 9. Only such one control mode is used in accordance with this embodiment, this control mode is characterized that: the electrolysis power supply 12 supplies the positive voltage to the electrode 3 via the output 17, and the electrode 1 is connected with the negative electrode of the electrolysis power supply 12 via the output 15, thus water and trace of impurities are electrolyzed at the gaps 7, 8 and 9. The electrode 2 has the same function as the control mode 2 in the first embodiment, but in difference that the positive voltage at the electrode 2 is dependent upon a voltage division of the gap 8 and the gap 7 relative to the voltage to the electrode 3 provided by the electrolysis power supply 12 via the output 17, but is not from the output 16 of the electrolysis power supply 12. Therefore, the pH value of the reduced water can be changed via using the gap distance of the gap 8 to control the electrode 2, or the same via changing the positive voltage and duration from the output 17 by the electrolysis power supply 12, and then reduced water with an according pH value is obtained. The working principle and process of the electrolysis device in accordance with this embodiment is same as the control mode 2 in the first embodiment. The measured indicator of reduced water in accordance with this embodiment are shown in Table 11 below.

TABLE 11

Tested Measured indicator of the Reduced water Manufactured from Pure Water via 3 Control Modes in accordance with the seventh embodiment

| Control Mode for electrolysis | | Control mode 1 | Control mode 2 | Control mode 3 |
|---|---|---|---|---|
| Indicator of Reduced Water | ORP (mv) | −431 | −402 | −192 |
| | Content of H (ppb) | 443 | 430 | 218 |
| | pH value | 9.6 | 8.4 | 6.0 |

Remark: electrolysis works for 3 minutes, at usual temperature, with raw water: ORP = +238 mv, a content of H = 0, pH = 5.5.

What is claimed is:

1. An electrolyzed water production device, comprising an electrolysis power supply and an electrolysis electrode assembly connected with the electrolysis power supply; wherein the electrolysis electrode assembly is immersed in water to be electrolyzed during work; there are neighboring electrodes at different voltages in the electrolysis electrode assembly, and the neighboring electrodes at different voltages forms gaps therebetween; a gap distance of each gap is set at a range of greater than 0 mm and less than 10 mm, and configured according to a minimization principle; within a dimension of the electrode assembly, the gaps between the neighboring electrodes at different voltages has a gap area configured according to a principle of optimal maximization; the neighboring electrodes at different voltages with the gap distance configured according to a minimization principle while the gap area configured according to a principle of optimal maximization; whereby the electrolysis device is capable of strongly electrolyzing impurities and water molecules so as to generate more free electrons and obtain a high electrolysis current;

wherein the electrode assembly is wrapped with one electrode in shape of cylinder, groove or U; the electrode in shape of cylinder, groove or U defines a passage for water in the electrode assembly to flow inwards and outwards; the electrode in shape of cylinder, groove or U as a first electrode is connected with a first output of the electrolysis power supply via a conductor; a cake-like electrode or a plane-shaped electrode as a second electrode is mounted inside the electrode in shape of cylinder, groove or U; a first gap is set between an outer peripheral surface of the second electrode and an inner peripheral surface of the electrode in shape of cylinder, groove or U; the second electrode is connected a second output of the electrolysis power supply by the conduct; a third electrode is arranged opposite to a back face of the second electrode relative to the first electrode; a second gap is set between the second electrode and the third electrode; the third electrode is connected with a third output of the electrolysis power supply via the conductor; a third gap is set between the third electrode and the neighboring electrode in shape of cylinder, groove or U; the first, second, and third gaps among the three electrodes are at a range of greater than 0 mm and less than 10 mm, and less than 0.1 mm if necessary; a work mode of the electrolysis electrode assembly is controlled by the first, second, and third outputs of the electrolysis power supply;

the electrolysis electrode assembly can respectively or simultaneously be varied that:

1) the second electrode and the third electrode or the third electrode and the second electrode, can be respectively configured a cellular and cake-like electrode or a corresponding comblike electrode insertable each other; comb teeth of the comblike electrode are fixed to a plate or relatively fixed, and are capable of inserting in corresponding cellular holes of the cellular and cake-like electrode; a gap is set between relative surfaces of the cellular and cake-like electrode and the comblike electrode, and is at a range of greater than 0 mm and less than 10 mm, and is capable of less than 0.1 mm if necessary;

2) a connection between the second or third electrode and the second or third output of the electrolysis power supply is able to switch off, and the work of the electrolysis electrode assembly is thus only controlled via the first and third outputs or the first and second outputs;

3) via the electrolysis electrode assembly being fixed in a water container for work, the water container from metal or conductive materials, and thus the electrode in shape of cylinder, groove or U of the electrolysis electrode assembly can be replaced by the water container with a difference that a bottom of the water container to replace the electrode in shape of cylinder, groove or U has no passage for electrolyzed water to flow;

4) the electrode in shape of cylinder, groove or U is replaced by a plate electrode, so that the electrode in shape of cylinder, groove or U is simplified to a top plate at a cylinder, and thus the first gap is nearly absent;

5) the second electrode is tightly fitted with the third electrode in the above 2), so that the second gap is 0 mm, and the work of the electrolysis electrode assembly is thus only controlled via the first and third outputs or the first and second outputs;

the neighboring electrodes at different voltages of the electrolysis electrode assembly therebetween have a gap distance at a range of greater than 0 mm and less than 10 mm, and is capable of less than 0.1 mm if necessary.

2. According to the device in claim 1, comprising a section of tubular channel, the electrolysis electrode assembly is mounted in the tubular channel, and the electrolysis power supply to provide power to the electrolysis electrode assembly; pure water or drinking water flows inwards from one port of the tubular channel and through the gaps between the neighboring electrodes at different voltages of the electrolysis electrode assembly; the gap distance at a range of greater than 0 mm and less than 10 mm, and is capable of less than 0.1 mm if necessary; water flows outwards from the other port of the tubular channel and is electrolyzed; the tubular channel is adapted for an electrode, and thus is used as one electrolysis electrode of the electrolysis electrode assembly.

3. According to the device in claim 1, wherein the device is configured as a portable electrolysis device, comprising the electrolysis power supply and the electrolysis electrode assembly connected with the electrolysis power supply; the electrolysis electrode assembly is immersed in water to be electrolyzed in an container during electrolysis, the electrolysis electrode assembly is capable of manufacturing electrolyzed water under a control of the electrolysis power supply; the neighboring electrodes at different voltages of the electrolysis electrode assembly therebetween have a gap distance at a range of greater than 0 mm and less than 10 mm, and is capable of less than 0.1 mm if necessary.

4. According to the device in claim 1, wherein the gap distance of each gap is capable of less than 0.1 mm.

5. According to the device in claim 1, wherein the gap distance of any one of gaps is at a range of greater than 0 mm and less than 0.1 mm.

* * * * *